US012615206B2

(12) United States Patent
Sikri et al.

(10) Patent No.: US 12,615,206 B2
(45) Date of Patent: Apr. 28, 2026

(54) LABEL DISTRIBUTION PROTOCOL GRACEFUL RESTART ON EXISTING SESSIONS

(71) Applicant: Ciena Corporation, Hanover, MD (US)

(72) Inventors: Sagar Sikri, Lucknow (IN); Gaurav Agarwal, Dwarka (IN); Pawan Sharma, Hapur (IN); Jayant Kumar Bhardwaj, Bijwasan (IN)

(73) Assignee: Ciena Corporation, Hanover, MD (US)

( * ) Notice: Subject to any disclaimer, the term of this patent is extended or adjusted under 35 U.S.C. 154(b) by 393 days.

(21) Appl. No.: 17/955,805

(22) Filed: Sep. 29, 2022

(65) Prior Publication Data

US 2024/0064096 A1     Feb. 22, 2024

(30) Foreign Application Priority Data

Aug. 16, 2022     (IN) .............................. 202211046436

(51) Int. Cl.
*H04L 45/50*          (2022.01)
(52) U.S. Cl.
CPC .................................. *H04L 45/507* (2013.01)
(58) Field of Classification Search
CPC ...................................................... H04L 45/507
See application file for complete search history.

(56) References Cited

U.S. PATENT DOCUMENTS

| | | | |
|---|---|---|---|
| 10,862,743 B2 | 12/2020 | Bhardwaj et al. | |
| 2009/0296568 A1* | 12/2009 | Kitada | H04L 45/28 |
| | | | 370/221 |

| | | | |
|---|---|---|---|
| 2014/0003227 A1* | 1/2014 | Scudder | H04L 69/40 |
| | | | 370/218 |
| 2014/0173133 A1* | 6/2014 | Ammireddy | H04L 45/03 |
| | | | 709/241 |
| 2016/0036630 A1* | 2/2016 | Luo | H04L 41/082 |
| | | | 370/244 |
| 2020/0014585 A1 | 1/2020 | Agarwal et al. | |
| 2020/0358681 A1 | 11/2020 | Shah et al. | |
| 2021/0352006 A1 | 11/2021 | Agarwal et al. | |
| 2021/0409311 A1* | 12/2021 | Wang | H04L 45/02 |
| 2022/0052964 A1 | 2/2022 | Bhardwaj et al. | |

FOREIGN PATENT DOCUMENTS

| | | |
|---|---|---|
| WO | 2022010981 A1 | 1/2022 |

OTHER PUBLICATIONS

M. Leelanivas et al., "Graceful Res, tart Mechanism for Label Distribution Protocol," Network Working Group, Category: Standards Track, The Internet Society, Feb. 2003, pp. 1-12.
L. Andersson et al., "LDP Specification," Network Working Group, Category: Standards Track, Oct. 2007, pp. 1-135.

* cited by examiner

*Primary Examiner* — Mansour Oveissi
(74) *Attorney, Agent, or Firm* — Baratta Law PLLC; Lawrence A. Baratta, Jr.

(57)          ABSTRACT

Systems and methods include operating a label distribution protocol (LDP) session with a peer node in a network; responsive to a change in graceful restart of the LDP session, sending a notification message to the peer node with a graceful restart capability change indication; responsive to receiving a second notification message from the peer node with graceful restart capability change indication, updating the graceful restart capability for the LDP session; and, responsive to failing to receive the second notification message, leaving the graceful restart capability as it was prior to the change.

20 Claims, 4 Drawing Sheets

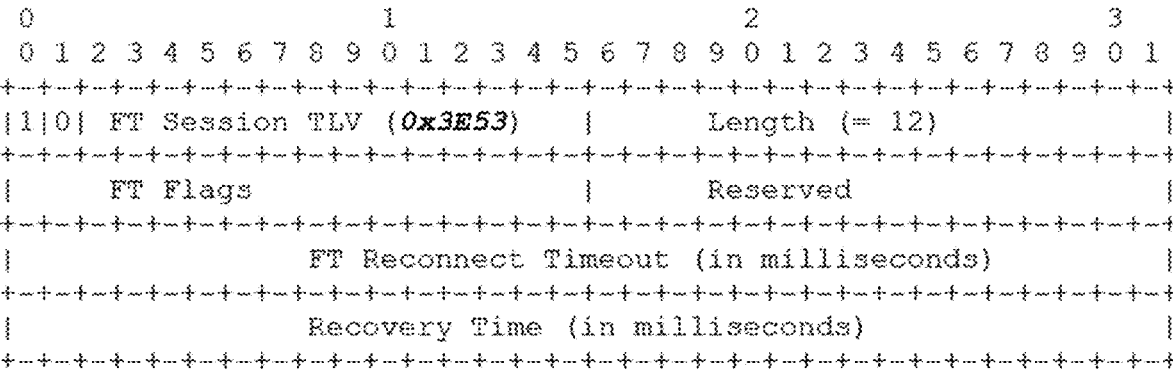

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0| FT Session TLV (0x3E53)     |        Length (= 12)         |
+-+-+-+-+-+-+-+-+-+-+-+-+-+-+-+-+-+-+-+-+-+-+-+-+-+-+-+-+-+-+-+-+
|       FT Flags                  |          Reserved            |
+-+-+-+-+-+-+-+-+-+-+-+-+-+-+-+-+-+-+-+-+-+-+-+-+-+-+-+-+-+-+-+-+
|              FT Reconnect Timeout (in milliseconds)            |
+-+-+-+-+-+-+-+-+-+-+-+-+-+-+-+-+-+-+-+-+-+-+-+-+-+-+-+-+-+-+-+-+
|              Recovery Time (in milliseconds)                   |
+-+-+-+-+-+-+-+-+-+-+-+-+-+-+-+-+-+-+-+-+-+-+-+-+-+-+-+-+-+-+-+-+
```

FIG. 2

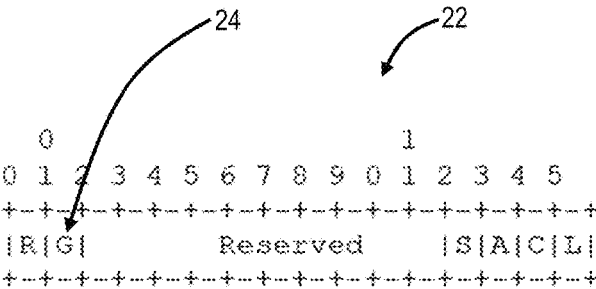

```
 0                   1
 0 1 2 3 4 5 6 7 8 9 0 1 2 3 4 5
+-+-+-+-+-+-+-+-+-+-+-+-+-+-+-+-+
|R|G|     Reserved      |S|A|C|L|
+-+-+-+-+-+-+-+-+-+-+-+-+-+-+-+-+
```

FIG. 3

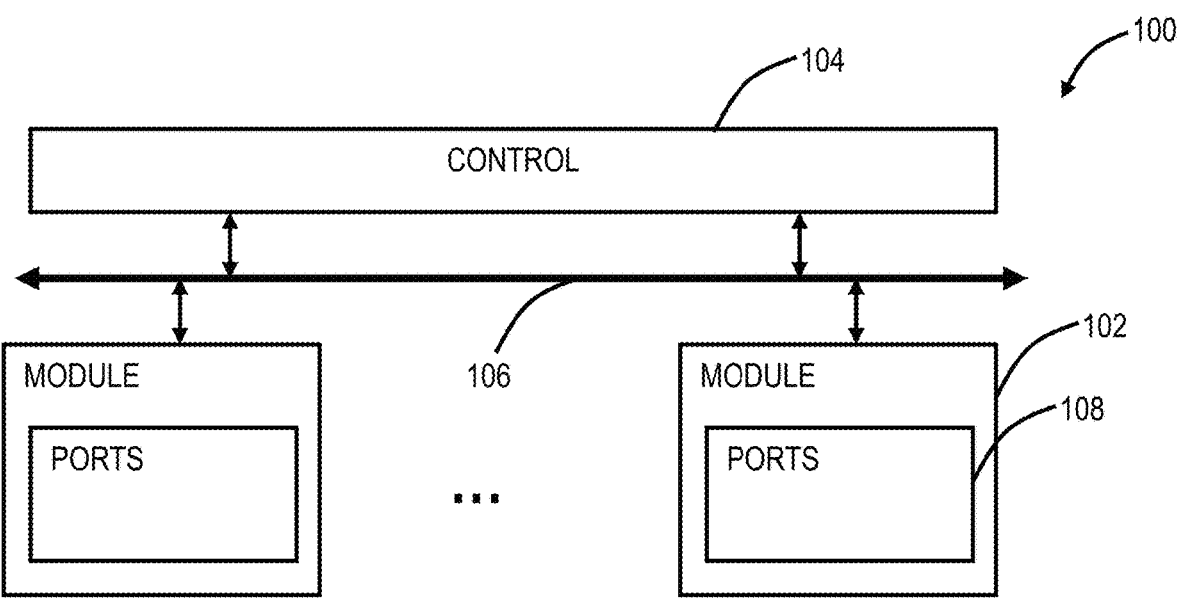
_FIG. 4_
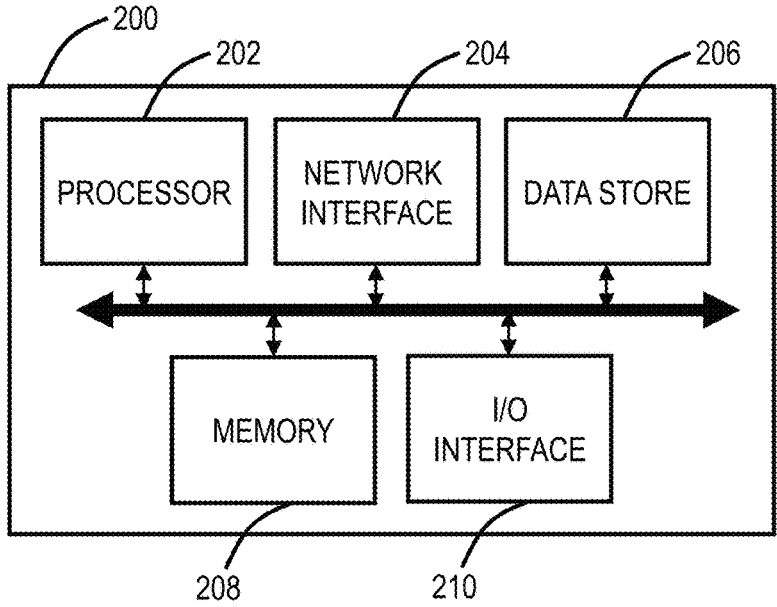
_FIG. 5_

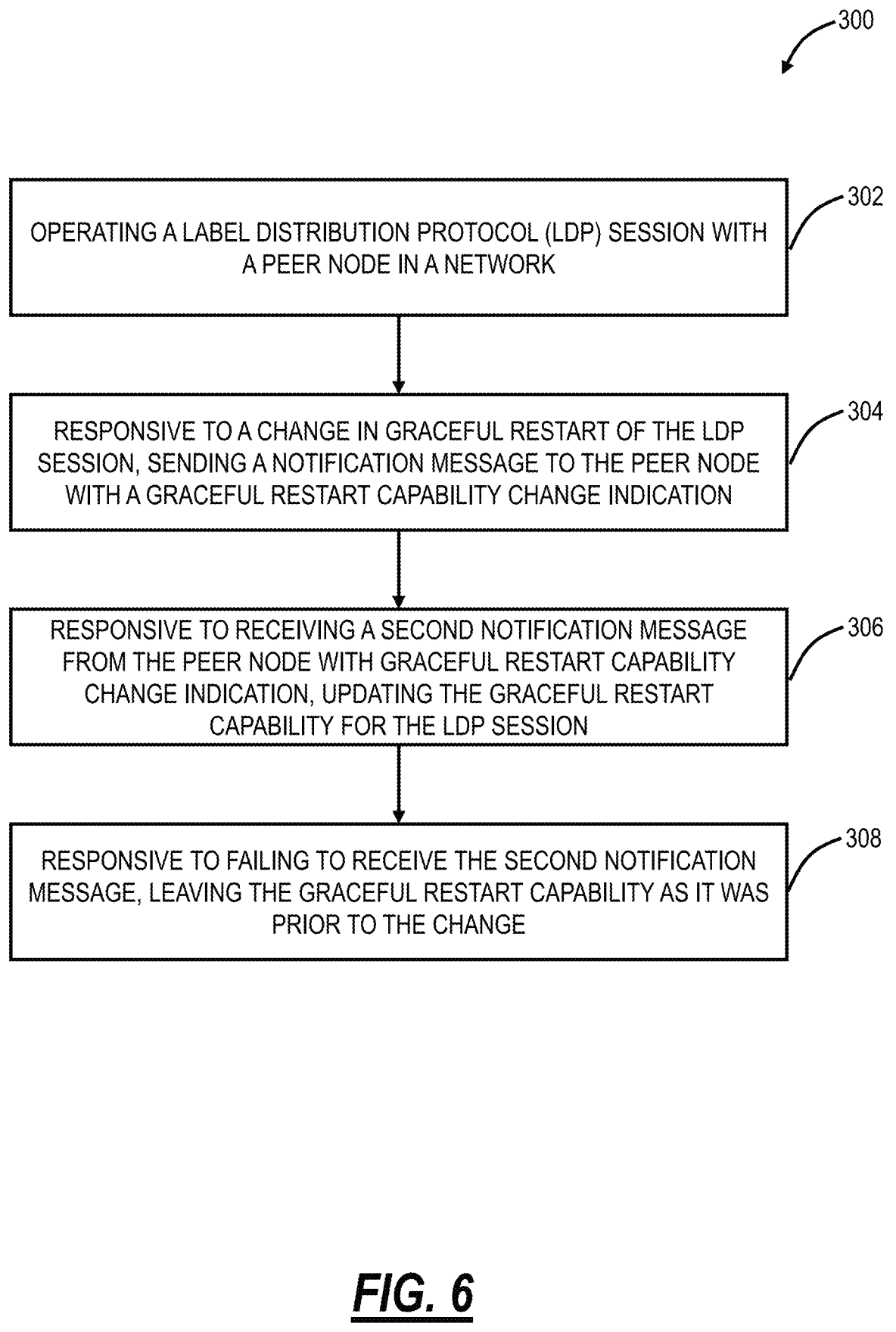

—300

—302
OPERATING A LABEL DISTRIBUTION PROTOCOL (LDP) SESSION WITH A PEER NODE IN A NETWORK

—304
RESPONSIVE TO A CHANGE IN GRACEFUL RESTART OF THE LDP SESSION, SENDING A NOTIFICATION MESSAGE TO THE PEER NODE WITH A GRACEFUL RESTART CAPABILITY CHANGE INDICATION

—306
RESPONSIVE TO RECEIVING A SECOND NOTIFICATION MESSAGE FROM THE PEER NODE WITH GRACEFUL RESTART CAPABILITY CHANGE INDICATION, UPDATING THE GRACEFUL RESTART CAPABILITY FOR THE LDP SESSION

—308
RESPONSIVE TO FAILING TO RECEIVE THE SECOND NOTIFICATION MESSAGE, LEAVING THE GRACEFUL RESTART CAPABILITY AS IT WAS PRIOR TO THE CHANGE

*FIG. 6*

LABEL DISTRIBUTION PROTOCOL GRACEFUL RESTART ON EXISTING SESSIONS

FIELD OF THE DISCLOSURE

The present disclosure relates generally to networking and computing. More particularly, the present disclosure relates to systems and methods for label distribution protocol (LDP) graceful restart on existing sessions.

BACKGROUND OF THE DISCLOSURE

LDP is described in RFC 5036, "LDP Specification," October 2007, and RFC 3479, "Fault Tolerance for the Label Distribution Protocol (LDP)," February 2003, the contents of each are incorporated by reference in their entirety. LDP is a protocol in which routers capable of multiprotocol label switching (MPLS) exchange label mapping information. Topology and targeted LDP are commonly used in MPLS-based network solutions, including segment routing, for establishment of label switched paths (LSP) and pseudo wires. LDP also provides the graceful restart (GR) support (non-stop forwarding (NSF)) which allows a routing device and its peer to retain the MPLS forwarding states during the control plane restart and restoration. This is described in RFC 3478, "Graceful Restart Mechanism for Label Distribution Protocol," February 2003, the contents of which are incorporated by reference in their entirety.

LDP is being demanded and used by multiple network operators. Also, LDP is a relatively older protocol that was designed when routers or network elements were simpler devices. As is well-known, network operators require software capable of upgrading or providing new functionality without impacting existing sessions. In advanced routers or network elements, software components are designed for independent and containerized functionality, and it provides a benefit to change some component without impacting others. A key feature is NSF which requires support from the protocol as well as from the other software components such as infrastructure, data plane, etc. During initial deployments, it is possible that even though the protocol is capable of doing the graceful restart to achieve NSF, however other components are not ready, and the network operator is unable to use GR for NSF.

In a typical deployment, once a router is deployed, multiple services are provisioned and it is possible that advanced software also supports upgrade of other individual components later, so that they also become NSF capable. If a network operator does not enable GR in the initial deployment, it is not possible to enable LDP GR on the existing session without tearing down all services going through that network element. This creates an issue and LDP does not currently support graceful restart in-service. There is no known solution to modify and apply the new LDP graceful restart capability at runtime, without affecting network services.

BRIEF SUMMARY OF THE DISCLOSURE

The present disclosure relates to systems and methods for label distribution protocol (LDP) graceful restart on existing sessions. The present disclosure improves the LDP protocol so that LDP GR capability can be enabled or disabled at runtime (on an existing sessions) without impacting the services. In an embodiment, an optional proprietary type-length-value (TLV) (e.g., from the Vendor-Private Range as per Internet Assigned Numbers Authority (IANA)) is provided which will be used in LDP notification message to provide this functionality if a network element supports this capability. Advantageously, this feature does not impact interworking with any different type or vendor's network element. In case a peer does not support this feature, it can simply ignore this update and session remains the way it was.

In an embodiment, a method includes steps of operating a label distribution protocol (LDP) session with a peer node in a network; responsive to a change in graceful restart of the LDP session, sending a notification message to the peer node with a graceful restart capability change indication; responsive to receiving a second notification message from the peer node with graceful restart capability change indication, updating the graceful restart capability for the LDP session; and, responsive to failing to receive the second notification message, leaving the graceful restart capability as it was prior to the change.

The LDP session can be initially created with an initialization message not having graceful restart, and wherein the change is to enable graceful restart at runtime without disrupting the LDP session. The LDP session also can be initially created with an initialization message having graceful restart, and wherein the change is to disable graceful restart at runtime without disrupting the LDP session. The notification message and the second notification message can be advisory notification messages.

The notification message and the second notification message can include a new fault tolerant (FT) type-length-value (TLV). The notification message can have a status code indicating a graceful restart capability change. The status code can be different from other status codes in LDP. The FT TLV can include FT flags for graceful restart configuration.

In another embodiment, a node in a network can include circuitry configured to implement the associated steps from the method. In a further embodiment, a non-transitory computer-readable medium can include instructions that, when executed, cause a processor or a network element to implement the associated steps from the method.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a diagram of a new FT session TLV.

FIG. 3 is a diagram of the FT flags section from the new FT session TLV of FIG. 2.

FIG. 4 is a block diagram of an example implementation of a node, such as for the routers in FIG. 1.

FIG. 5 is a block diagram of an example controller, which can form a controller for the node.

FIG. 6 is a flowchart of a process for LDP graceful restart on existing sessions.

DETAILED DESCRIPTION OF THE DISCLOSURE

Figure 1:
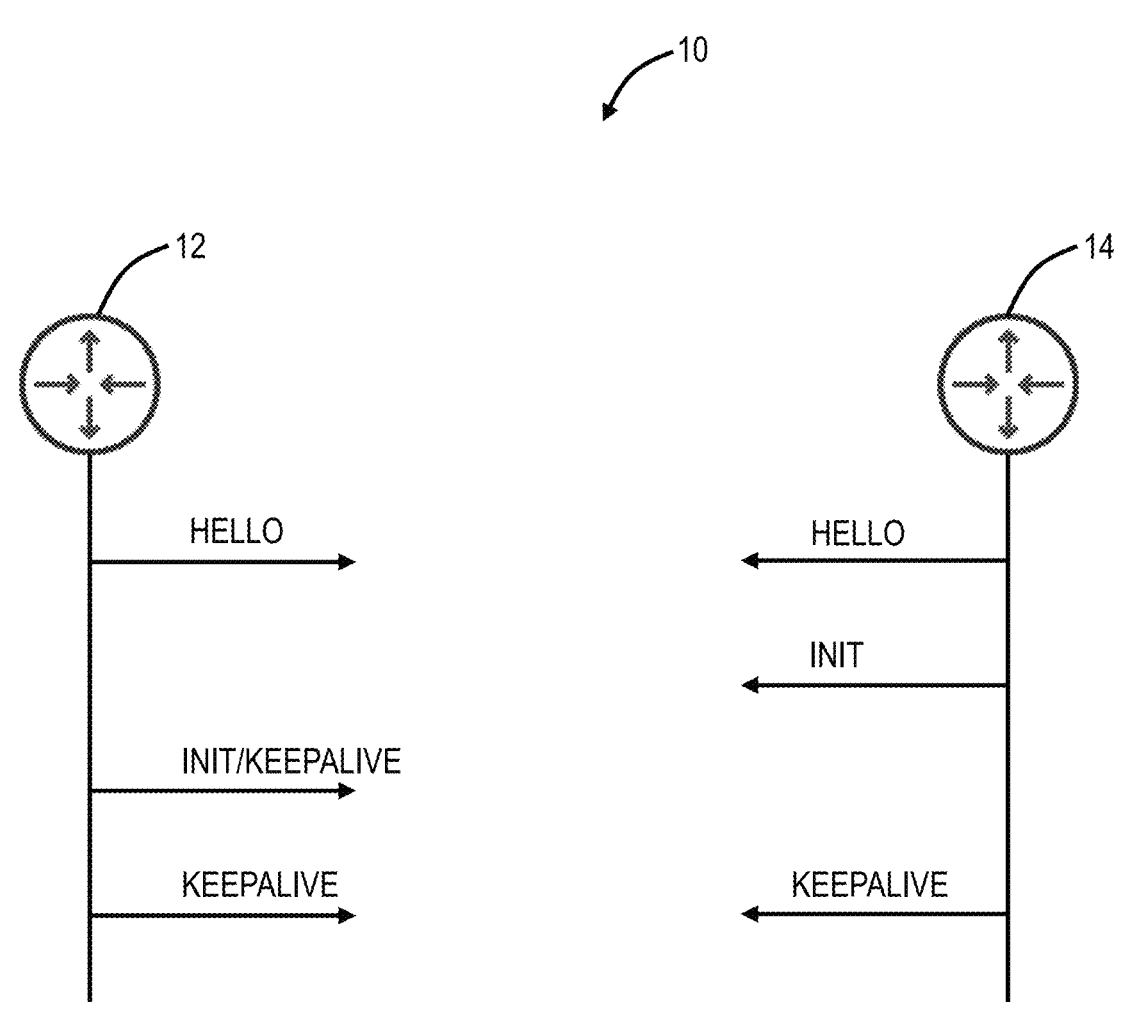
FIG. 1 is a network diagram of a network with two routers for illustrating LDP operation.

Again, the present disclosure relates to systems and methods for label distribution protocol (LDP) graceful restart on existing sessions. The present disclosure improves the LDP protocol so that LDP GR capability can be enabled or disabled at runtime (on an existing sessions) without impacting the services. In an embodiment, an optional proprietary type-length-value (TLV) (e.g., from the Vendor-Private Range as per Internet Assigned Numbers Authority (IANA)) is provided which will be used in LDP notification message to provide this functionality if a network element supports this capability. Advantageously, this feature does not impact interworking with any different type or vendor's network element. In case a peer does not support this feature, it can simply ignore this update and session remains the way it was.

LDP

FIG. 1 is a network diagram of a network 10 with two routers 12, 14 for illustrating LDP operation. The routers 12, 14 can be referred to as label switched routers (LSRs) and the network 10 can be an MPLS or segment routing network. Those skilled in the art will recognize the network 10 is simplified for illustration purposes and there can be various other network elements. Two LSRs 12, 14 that use LDP to exchange label/FEC mapping information are known as "LDP Peers" with respect to that information, and we speak of there being an "LDP Session" between them. A single LDP session allows each peer to learn the other's label mappings; i.e., the protocol is bidirectional.

LDP includes various messages exchanged between the LSRs 12, 14. The messages can be categorized as discovery messages, session messages, advertisement messages, and notification messages. The discovery messages can include HELLO messages. The exchange of two HELLO messages is used to trigger an LDP session establishment, via INIT (initialization) messages.

As described herein, graceful restart is described in RFC 3478 and 3479. GR is a mechanism that helps to minimize the negative effects on MPLS traffic caused by an LSR's 12, 14 control plane restart, specifically by the restart of its LDP component, on LSRs that are capable of preserving the MPLS forwarding component across the restart. Again, as noted herein, GR has to be enabled at LDP session establishment, namely in a fault tolerant TLV which is an optional parameter in the INIT message. There is no approach that enables GR enable or disable without taking down the service.

LDP Notification Message with GR Capability Change

The present disclosure includes a new proprietary TLV type, e.g., 0x3E53, and new status code, e.g., 0x3F003E53 which can be used in the LDP notification message to notify the "GR capability changed" event to the LDP peer at run time. This new optional TLV can be based on FT Session TLV (defined in RFC3479 with type 0x0503). This TLV is used with U bit set so that it can be silently discarded if not supported on another node.

FIG. 2 is a diagram of a new FT session TLV 20. The FT flags section 22 is a 16-bit field that indicates various attributes the FT support on this LDP session. This FT flags section 22 is formatted as illustrated in FIG. 3. The present disclosure includes some indication in the FT flags section 22 to signify a GR enable or disable. In an embodiment, a G bit 24 is used to signify GR enable (e.g., 1) or GR disable (e.g., 0). Those skilled in the art will recognize this can be located anywhere in the new FT session TLV 20, including any reserved section. The other bits in the FT flags section 22 hold the same significance and usage as in Original FT-TLV implementation (RFC3479) and are applicable/set only when G=1, i.e., is enabled.

The new FT session TLV 20 can be included in a status notification message, such as an advisory notification. Also, a new status code is provided to indicate a GR capability change event. Of note, the present disclosure includes the new FT session TLV 20 and the new status code, and the new status code is used in a status TLV to indicate the GR capability change event. That is, while the term "new" is used for both the new status code and the new FT session TLV 20, the new status code is not part of the new FT session TLV 20, but rather used in the status code section of the existing status TLV. For example, the new status code can be 0x3F003E53 or some other value. Of note, the status TLV E bit is set to Zero to indicate that it is an advisory notification.

| Status Code | E bit | Status Data |
|---|---|---|
| GR Capability Changed | 0 | 0x3F003E53 |

Procedure to Change the LDP GR Capability on an Existing LDP Session

The use of this procedure is demonstrated with the routers 12, 14 in FIG. 1, where the router 12 can be a provider edge 1 (PE1) and the router 14 can be a PE2. An LDP session is established between PE1 and PE2 node without GR initially enabled, and PE1 node wants to change the GR capability on the LDP session.

The PE1 node is the initiator and sends an LDP notification message with—

(1) "New" Status Code 0x3F003E53 and E=0 in Status-TLV, to indicate the GR Capability Changed event.

(2) "New" FT Session TLV with G=1 if GR capability is enabled, otherwise G=0.

The PE2 node is the receiver and on receiving the LDP notification, processes the Status TLV with New Status Code 0x3F003E53. It then processes the "New" FT Session TLV and checks for G bit.

(1) If G bit 1 is received—If GR is locally enabled on PE2, send a notification message with Status Code 0x3F003E53 and "New" FT Session TLV with G bit set to 1, and enable the GR on PE2 and update the restart and recovery time.

(2) If GR is locally disabled on PE2, send a notification message with Status Code 0x3F003E53 and "New" FT Session TLV with G bit set to 0, and disable the GR on PE2 for this session. Reset the recovery and restart time to local values. With G=1, the value of flags R/S/A/C/L, hold the same significance and usage as Original FT-TLV implementation (RFC3479). With G=0, these are N/A.

(3) If G bit 0 is received—If GR is locally enabled on PE2, send a notification message with Status Code 0x3F003E53 and "New" FT Session TLV with G bit set to 1, and disable the GR on PE2 for this session. Reset the recovery and restart time to local values. If GR is locally disabled on PE2, send a notification message with Status Code 0x3F003E53 and "New" FT Session TLV with G bit set to 0, and disable the GR on PE2 for this session. Reset the recovery and restart time to local values. With G=1, the value of flags R/S/A/C/L, hold the same significance and usage as Original FT-TLV implementation (RFC3479). With G=0, these are N/A.

For the initiator, If node receives an LDP notification with Status code 0x3F003E53 and New FT Session TLV, it need not send further notification message to peer if it had already sent earlier (like PE1 in this case). In this case the node simply needs to enable/disable GR as per the Receiver Logic. If initiator does not receive any notification message with Status code 0x3F003E53 and New FT Session TLV, then the implementation may decide on its own timeout mechanism and subsequent actions.

If LDP session is in recovery phase and GR capability is disabled at run time, it should clear the stale label entries and stop the recovery timer.

The New FT Session TLV will be used with U bit set, so that if the receiver node does not support the TLV, this new TLV can be silently discarded without having any impact on the notification procedure.

Example Node

FIG. 4 is a block diagram of an example implementation of a node 100, such as for the routers 12, 14. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support segment routing or MPLS networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

FIG. 5 is a block diagram of an example controller 200, which can form a controller for the node 100. The controller 200 can be part of the node 100 or a stand-alone device communicatively coupled to the node 100. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Runtime GR Enable/Disable Process FIG. 6 is a flowchart of a process 300 for LDP graceful restart on existing sessions. The process 300 contemplates implementation as a method having steps, via the node 14, 100, and as instructions stored in a non-transitory computer-readable medium that cause a node to perform the steps. The steps include operating (302) a label distribution protocol (LDP) session with a peer node (14) in a network (10); responsive (304) to a change in graceful restart of the LDP session, sending a notification message to the peer node (14) with a graceful restart capability change indication; responsive (306) to receiving a second notification message from the peer node (14) with graceful restart capability change indication, updating the graceful restart capability for the LDP session; and, responsive (308) to failing to receive the second notification message, leaving the graceful restart capability as it was prior to the change.

In an embodiment, the LDP session is initially created with an initialization message not having graceful restart, and wherein the change is to enable graceful restart at runtime without disrupting the LDP session. In another embodiment, the LDP session is initially created with an initialization message having graceful restart, and wherein the change is to disable graceful restart at runtime without disrupting the LDP session.

The notification message and the second notification message can be advisory notification messages. The notification message and the second notification message can include a new fault tolerant (FT) type-length-value (TLV) (20). The notification message and the second notification message can have a status code, in the status TLV, indicating a graceful restart capability change. The status code can be different from other status codes in LDP, i.e., a new status code. The FT TLV (20) can include FT flags (22) for graceful restart configuration.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like.

When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A node in a network comprising:
one or more modules and a plurality of ports; and
circuitry configured to
  operate a label distribution protocol (LDP) session with a peer node in a network;
  responsive to a change in graceful restart of the LDP session, send a notification message to the peer node with a graceful restart capability change indication;
  responsive to receiving a second notification message from the peer node with graceful restart capability change indication, update the graceful restart capability for the LDP session, wherein the notification message and second notification messages each include a fault tolerant (FT) type-length-value (TLV) that signals a runtime change in graceful restart capability and a status TLV carrying a status code, distinct from existing LDP status codes, to indicate that capability change, wherein the runtime change occurs during the LDP session after session establishment without tearing down the LDP session, and wherein the ET TLV includes a FT flags field comprising a graceful restart enable/disable bit that indicates whether graceful restart is enabled or disabled for the LDP session; and
  responsive to failing to receive the second notification message, leave the graceful restart capability as it was prior to the change.

2. The node of claim 1, wherein the LDP session is initially created with an initialization message not having graceful restart; and wherein the change is to enable graceful restart dynamically at runtime without requiring a session teardown disrupting the LDP session.

3. The node of claim 1, wherein the LDP session is initially created with an initialization message having graceful restart; and wherein the change is to disable graceful restart dynamically at runtime without disrupting the LDP session.

4. The node of claim 1, wherein the notification message and the second notification message are advisory notification messages.

5. The node of claim 1, wherein the FT TLV is a vendor-private type-length value (TLV) having an unknown bit set such that the ET TLV is silently discarded by a peer node that does not support the FT TLV.

6. The node of claim 5, wherein the status code in the status TLV indicates a graceful restart capability change.

7. The node of claim 6, wherein the status code is different from other status codes in LDP.

8. The node of claim 6, wherein the FT TLV includes FT flags for graceful restart configuration.

9. A method comprising steps of:

operating a label distribution protocol (LDP) session with a peer node in a network;

responsive to a change in graceful restart of the LDP session, sending a notification message to the peer node with a graceful restart capability change indication;

responsive to receiving a second notification message from the peer node with graceful restart capability change indication, update the graceful restart capability for the LDP session, wherein the notification message and second notification messages each include a fault tolerant (FT) type-length-value (TLV) that signals a runtime change in graceful restart capability and a status TLV carrying a status code, distinct from existing LDP status codes, to indicate that capability change, wherein the runtime change occurs during the LDP session after session establishment without tearing down the LDP session, and wherein the FTV TLV includes a FT flags field comprising a graceful restart enable/disable bit that indicates whether graceful restart is enabled or disabled for the LDP session; and responsive to failing to receive the second notification message, leaving the graceful restart capability as it was prior to the change.

10. The method of claim 9, wherein the LDP session is initially created with an initialization message not having graceful restart; and wherein the change is to enable graceful restart dynamically at runtime without requiring a session teardown disrupting the LDP session.

11. The method of claim 9, wherein the LDP session is initially created with an initialization message having graceful restart; and wherein the change is to disable graceful restart dynamically at runtime without disrupting the LDP session.

12. The method of claim 9, wherein the notification message and the second notification message are advisory notification messages.

13. The method of claim 9, wherein the FT TLV is a vendor-private type-length-value (TLV) having an unknown bit set such that the ET TLV is silently discarded by a peer node that does not support the FT TLV.

14. The method of claim 13, wherein the status code in the status TLV indicates a graceful restart capability change.

15. The method of claim 14, wherein the status code is different from other status codes in LDP.

16. The method of claim 14, wherein the FT TLV includes FT flags for graceful restart configuration.

17. A non-transitory computer-readable medium comprising instructions that, when executed, cause a node in a network to perform steps of:

operating a label distribution protocol (LDP) session with a peer node in a network;

responsive to a change in graceful restart of the LDP session, sending a notification message to the peer node with a graceful restart capability change indication;

responsive to receiving a second notification message from the peer node with graceful restart capability change indication, update the graceful restart capability for the LDP session, wherein the notification message and second notification messages each include a fault tolerant (FT) type-length-value (TLV) that signals a runtime change in graceful restart capability and a status TLV carrying a status code, distinct from existing LDP status codes, to indicate that capability change, wherein the runtime change occurs during the LDP session after session establishment without tearing down the LDP session, and wherein the FTV TLV includes an FT flags field comprising a graceful restart enable/disable bit that indicates whether graceful restart is enabled or disabled for the LDP session; and responsive to failing to receive the second notification message, leaving the graceful restart capability as it was prior to the change.

18. The non-transitory computer-readable medium of claim 17, wherein the LDP session is one of initially created with an initialization message not having graceful restart, and wherein the change is to enable graceful restart at runtime without disrupting the LDP session; and initially created with an initialization message having graceful restart, and wherein the change is to disable graceful restart dynamically at runtime without disrupting the LDP session.

19. The non-transitory computer-readable medium of claim 17, wherein the LDP session is initially created with an initialization message not having graceful restart; and wherein the change is to enable graceful restart dynamically at runtime without requiring a session teardown disrupting the LDP session.

20. The non-transitory computer-readable medium of claim 17, wherein the LDP session is initially created with an initialization message having graceful restart; and wherein the change is to disable graceful restart dynamically at runtime without disrupting the LDP session.

\*    \*    \*    \*    \*